(12) United States Patent
Harris et al.

(10) Patent No.: US 6,170,346 B1
(45) Date of Patent: Jan. 9, 2001

(54) ROTARY-TO-LINEAR ACTUATOR

(75) Inventors: Bernard Harris, Northbrook; Dennis E. Bozych, Downers Grove; Dawne A. Garrett, Willowbrook, all of IL (US)

(73) Assignee: Rexnord Corporation, Milwaukee, WI (US)

( * ) Notice: Under 35 U.S.C. 154(b), the term of this patent shall be extended for 0 days.

(21) Appl. No.: 09/324,200

(22) Filed: Jun. 2, 1999

(51) Int. Cl.⁷ .................................................. F16H 27/02
(52) U.S. Cl. ............................................................ 74/89.15
(58) Field of Search ................................ 74/89.15, 459, 74/458; 72/88; 470/10

(56) References Cited

U.S. PATENT DOCUMENTS

| | | | |
|---|---|---|---|
| 3,461,470 | * 8/1969 | Cochrum | 470/10 |
| 3,713,932 | 1/1973 | Butzow et al. | 156/173 |
| 3,772,720 | * 11/1973 | Yamamoto | 72/88 X |
| 3,813,718 | * 6/1974 | Kamiya | 72/88 X |
| 4,282,764 | 8/1981 | Harris | 74/89.15 |
| 4,648,285 | * 3/1987 | Carson | 74/458 X |
| 4,760,635 | * 8/1988 | Miller | 29/558 |
| 4,782,688 | * 11/1988 | Kawashima | 72/88 X |
| 4,811,618 | * 3/1989 | Takayama | 74/89.15 |
| 4,840,077 | * 6/1989 | Katahira | 74/458 X |
| 4,964,314 | * 10/1990 | Wilkes | 74/424.8 C |
| 5,725,344 | * 3/1998 | Petrella | 411/299 |

* cited by examiner

Primary Examiner—Charles A Marmor
Assistant Examiner—Ha Ho
(74) Attorney, Agent, or Firm—Quarles & Brady LLP

(57) ABSTRACT

A rotary-to-linear actuator includes a threaded rigid shaft, and a collar engaging the threads. The collar is formed from a low friction material reinforced by successive layers of parallel filaments. The filaments are oriented to lie across the outwardly convex projecting faces of the shaft threads.

10 Claims, 1 Drawing Sheet

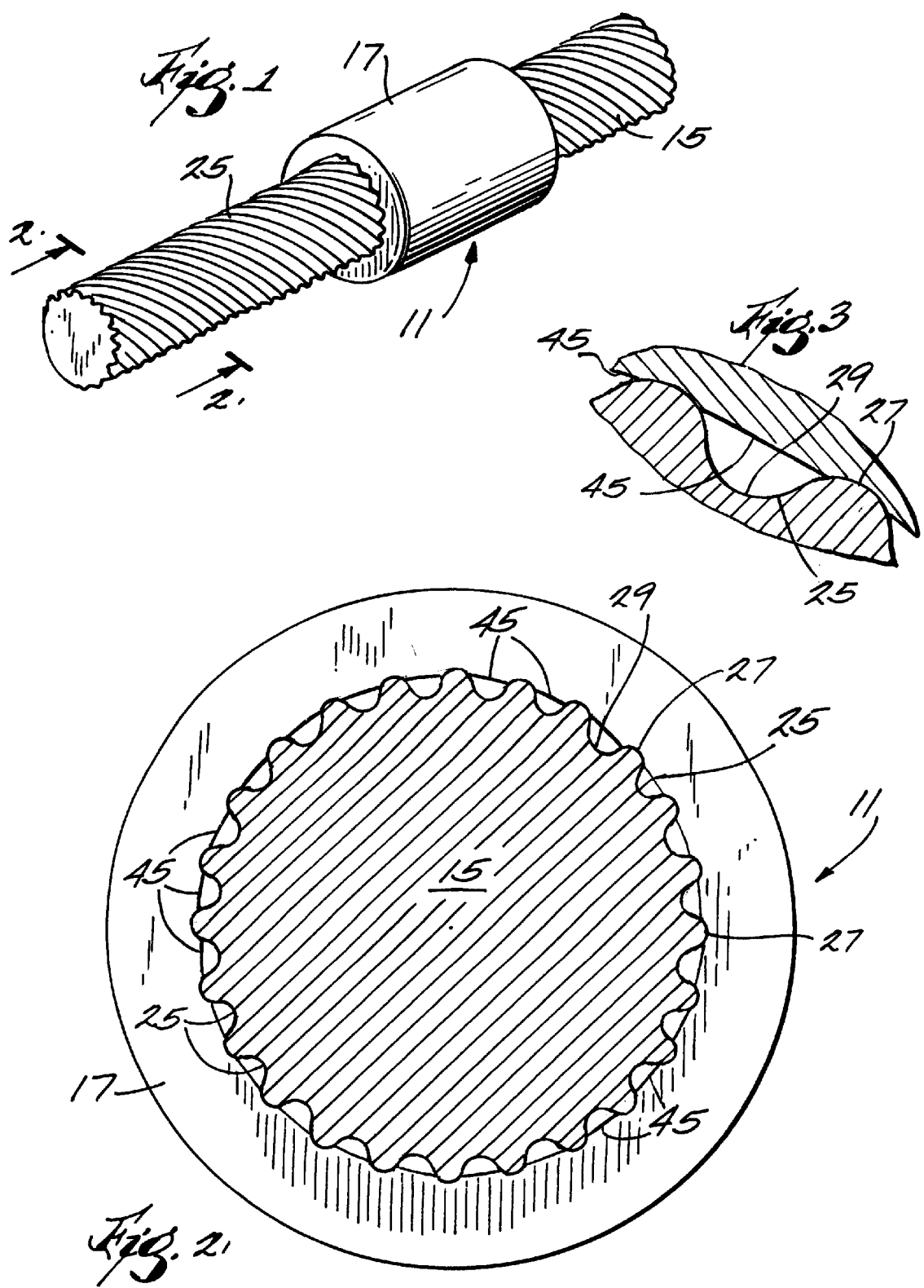

ROTARY-TO-LINEAR ACTUATOR

BACKGROUND OF THE INVENTION

The invention relates to rotary-to-linear actuators of the general type disclosed in U.S. Pat. No. 3,713,932, issued Jan. 30, 1973, and in U.S. Pat. No. 4,282,764 issued Aug. 11, 1981, which patents are incorporated herein by reference and which patents constitute prior art.

In U.S. Pat. No. 4,282,764, an external metallic helical hexagon thread form is employed, which thread form is required to be machined, which machining is excessively costly.

SUMMARY OF THE INVENTION

The invention provides a rotary-to-linear actuator which includes a rigid shaft having a diameter, and a plurality of rolled parallel helical grooves, and a resinous collar fabricated of low friction material and having a like plurality of corresponding spiral ridges received in the grooves, whereby one rotation of the shaft displaces the collar through a distance equal to the lead or pitch.

The invention also provides a rotary-to-linear actuator which includes a rigid shaft, and a plurality of rolled parallel helical grooves which are eight or more in number, which have a projecting face, which are generated by a straight line extending at a fixed angle respecting a plane normal to the helical axis, and which provide a lead or pitch, and a resinous collar fabricated of low friction material and including a like plurality of corresponding spiral ridges received in the grooves and reinforced by successive layers of parallel filaments helically wound over and around the low friction material and including first inner layers wound at an angle not greater than the fixed angle such that the filaments lie across the projecting faces of the spiral ridges, whereby one rotation of the shaft displaces the collar a distance which may be a multiple of the diameter of the shaft.

Other features and advantages of the invention will become apparent to those skilled in the art upon review of the following detailed description, claims and drawings.

DESCRIPTION OF THE DRAWINGS

FIG. 1 is a perspective view of a rotary-to-linear actuator which incorporates various of the features of the invention.

FIG. 2 is a cross-sectional view taken along line 2—2 of FIG. 1.

FIG. 3 is a partial cross-sectional view taken along long 2—2 of FIG. 1.

Before one embodiment of the invention is explained in detail, it is to be understood that the invention is not limited in its application to the details of the construction and the arrangements of components set forth in the following description or illustrated in the drawings. The invention is capable of other embodiments and of being practiced or being carried out in various ways. Also, it is understood that the phraseology and terminology used herein is for the purpose of description and should not be regarded as limiting.

DESCRIPTION OF THE PREFERRED EMBODIMENT

Shown in FIG. 1 of the drawings is a rotary-to-linear actuator 11 which includes a screw or shaft 15 and a nut or collar 17 which is received on the shaft 15 and which is displaceable axially of the shaft 15 in response to rotation of the shaft 15. Alternately, if desired, the nut or collar 17 can be displaced axially of the screw or shaft 15 to cause the screw or shaft 15 to rotate.

The shaft 15 can be fabricated of any suitable rigid material, such as steel.

The shaft 15 includes a plurality of parallel helical threads 25 which can be of any desired number more than 8, and which, in the disclosed embodiment, are 24 in number. The helical threads 25 are preferably rolled and each have an outwardly convex projecting face 27 separated by an outwardly concave valley 29 between the outwardly convex faces 27. In the illustrated embodiment, the helical threads 25 are generated by a straight line extending at a fixed angle of ten degrees respecting a plane normal to the helical axis. Other fixed angles can also be employed. In the illustrated construction, the threads 25 provide an axial advance or lead or pitch which is a multiple of the shaft diameter, which multiple is four in the embodiment of the invention shown in the drawings, with the result that the axial advance or pitch or lead is two inches if the shaft diameter is one-half inch.

While other methods can be employed, in the disclosed construction, and as already indicated, the threads 25 are preferably rolled. Such rolling is more economical to manufacture, as compared, for instance, to machining. In particular, when the number of threads 25 is more than eight, rolling is clearly the most effective and economical method for producing the threads 25 on the shaft 15.

The collar 17 can be fabricated of any suitable low friction material and in the disclosed construction is fabricated of resinous material in the general manner disclosed in U.S. Pat. No. 4,282,764 and includes a like plurality of corresponding spiral threads or ridges 45 which are received in the threads 25 and reinforced by successive layers of parallel filaments helically wound over and around the low friction material. The spiral threads or ridges 45 include first inner layers (shown) wound at an angle not greater than the above mentioned fixed angle such that the filaments lie across the outwardly convex projecting faces of the spiral threads or ridges 45 and does span the grooves.

Thus, in the specifically disclosed construction, one rotation of the shaft 15 displaces the collar 17 through an axial distance of about four times the diameter of the shaft.

As more fully explained in U.S. Pat. No. 4,282,764, in the fabrication of the collar, a suitable tubular fabric (not shown) woven from a suitable resinous material, such as polytetrafluoro ethylene, (PTFE) is placed over a mandrel (not shown) with the desired configuration corresponding to the thread form of the shaft 15. The fabric is then shrunk until the fabric bridges the threads by taking the shortest distance between the threads or ridges 45, much like a cord of a circle and not the shape of an arch. Filament wound fiber glass reinforcement is then applied at a steep angle over the woven fabric. Such reinforcement provides structural rigidity and molds the woven fabric to the mandrel with the external thread form and, after curing, provides structural strength to the collar 17.

The invention involves employing multiple starts with a suitable rolled thread form, such as a stub Acme thread form. The more starts the better for the woven (PTFE) fibers which distribute the load over a greater area. In the past, the fibers supporting the woven fabric had to be placed into the thread form, and then the woven fabric was shrunk. With the use of multiple start Acme threads, many starts can be used. Thus, the invention utilizes a low cost metallic mating surface (shaft 15) with multiple starts for better support of the wear element (collar 17). The shaft 15 can be thread rolled in long lengths.

Thus, because of the use of multiple threads 25, and the like plurality of threads or ridges 45 received in the threads 25, the load carrying capability of the actuator 11 is greatly increased, while, at the same time, wear is reduced. More specifically, the multiple rolled threads or grooves 15 greatly reduce manufacturing time and improve the wear life of the nut or collar 17 by increasing the number of engaged threads. Various of the features are set forth in the following claims.

What is claimed is:

1. A rotary-to-linear actuator comprising:

a rigid shaft having a diameter, and a plurality of parallel helical grooves defining a helical axis, wherein said grooves are formed at a fixed angle relative to a plane normal to said helical axis defining a pitch, each of said grooves having an outwardly projecting convex face; and a resinous collar fabricated of low friction material and reinforced by first and successive layers of parallel filaments wound over and around said low friction material, said first layer of parallel filaments being wound at an angle such that the filaments of said first layer lie across said outwardly convex projecting faces of said grooves and forming a plurality of corresponding spiral ridges received in said grooves such that the filaments do not completely fill said grooves, whereby one rotation of said shaft displaces said collar through an axial distance equal to said pitch.

2. A rotary-to-linear actuator in accordance with claim 1 wherein said axial distance is greater than the diameter of the shaft.

3. A rotary-to-linear actuator in accordance with claim 1 wherein said plurality of parallel helical grooves provide a lead or pitch equal to a multiple of the diameter of the shaft.

4. A rotary-to-linear actuator in accordance with claim 1 wherein said parallel helical grooves are generated by a straight line extending at a fixed angle respecting a plane normal to the helical axis and provide a lead or pitch equal to a multiple of the diameter of the shaft.

5. A rotary-to-linear actuator in accordance with claim 1 wherein said parallel helical grooves are eight or more in number.

6. A rotary-to-linear actuator in accordance with claim 1 wherein said plurality of parallel helical grooves have a projecting face.

7. A rotary-to-linear actuator in accordance with claim 1 wherein said plurality of parallel helical grooves have respective projecting faces, and wherein said plurality of corresponding spiral ridges are reinforced by successive layers of parallel filaments wound over and around said low friction material and including first inner layers wound at an angle greater than said fixed angle such that the filaments lie across said projecting face of the spiral ridge.

8. A rotary-to-linear actuator in accordance with claim 1 wherein said spiral ridges are reinforced by successive layers of parallel filaments wound over and around said low friction material and including first inner layers wound at an angle greater than said fixed angle such that the filaments lie across said projecting faces of the spiral ridges.

9. A rotary-to-linear actuator in accordance with claim 1 wherein said axial distance is a multiple of said diameter.

10. A rotary-to-linear actuator in accordance with claim 9 wherein said multiple is four.

\* \* \* \* \*